May 25, 1943.  A. H. JOBERT  2,320,039
AUTOMATIC STOCKING MEANS FOR BAR MACHINES
Filed Aug. 13, 1940  10 Sheets-Sheet 1
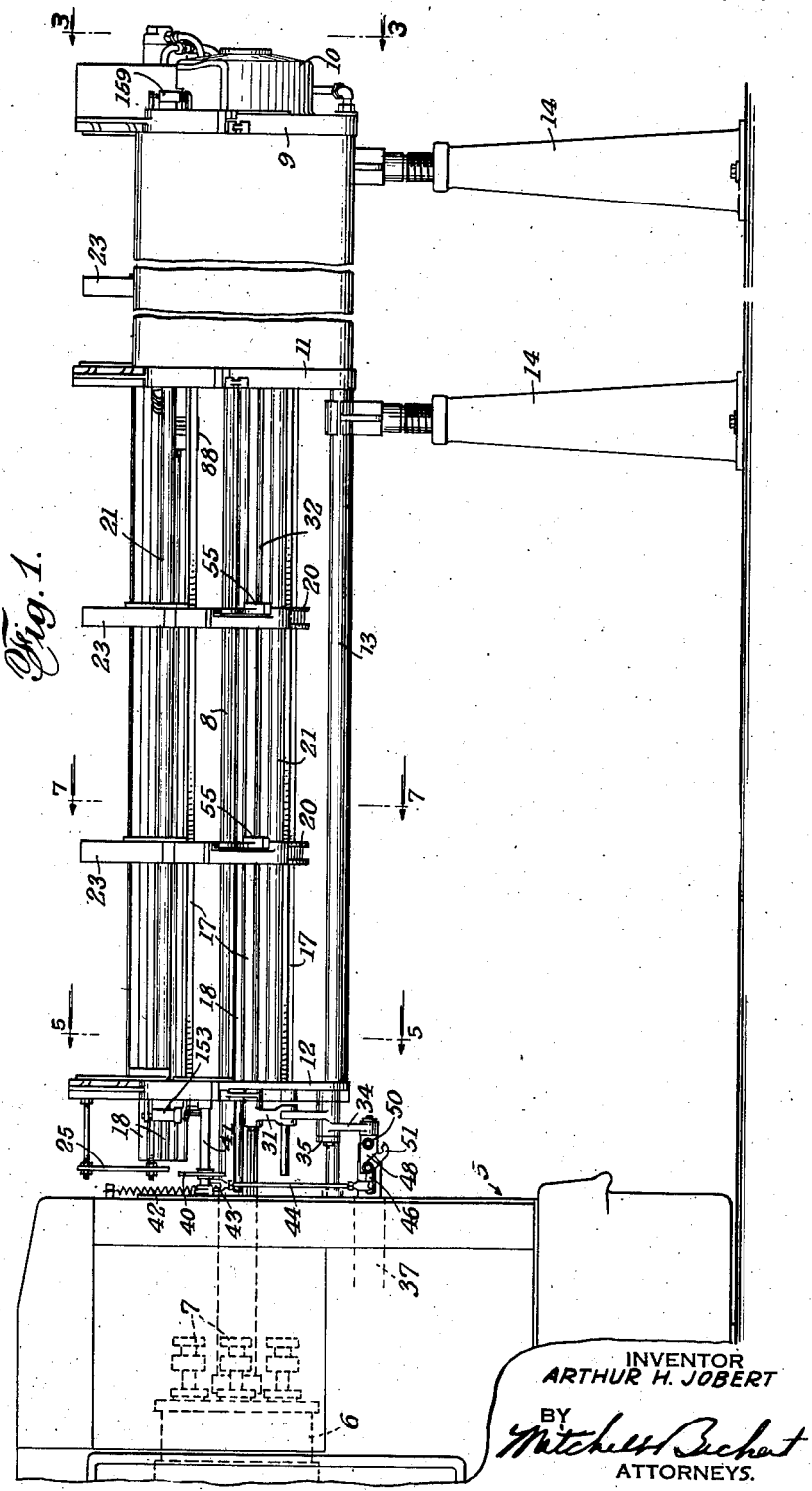
INVENTOR
ARTHUR H. JOBERT
BY
ATTORNEYS.

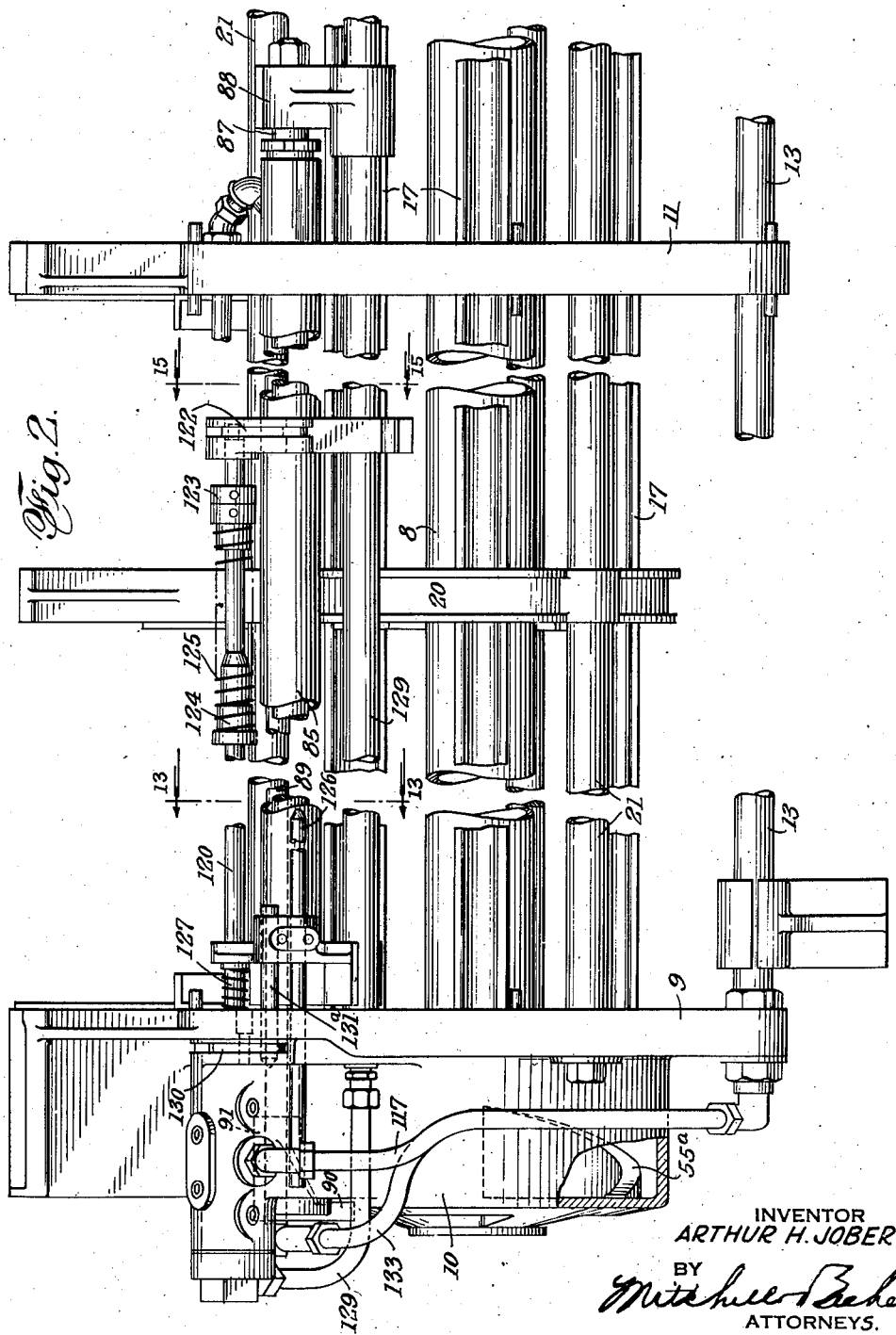

May 25, 1943. A. H. JOBERT 2,320,039
AUTOMATIC STOCKING MEANS FOR BAR MACHINES
Filed Aug. 13, 1940 10 Sheets-Sheet 3
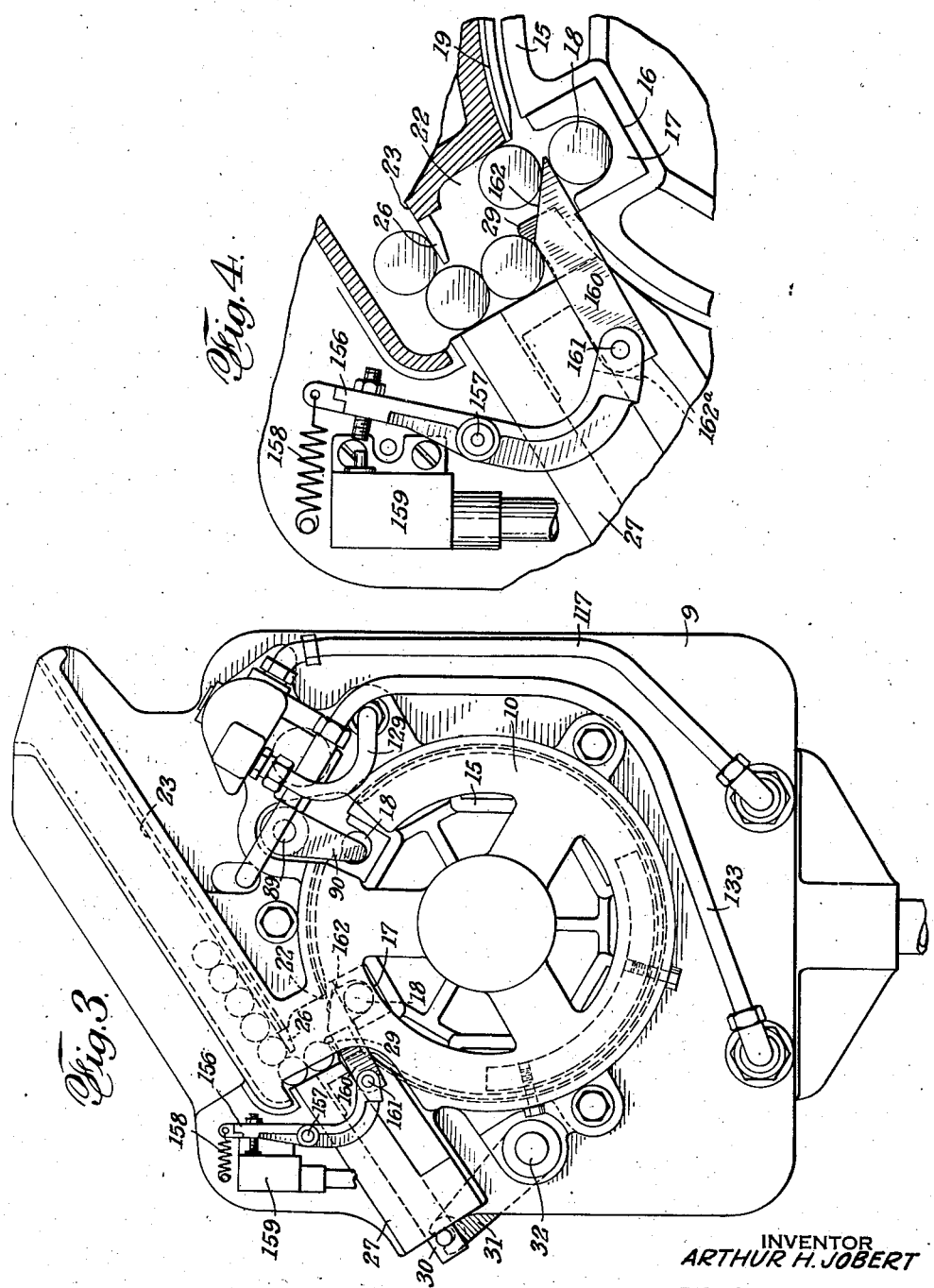
INVENTOR
ARTHUR H. JOBERT
BY
Mitchell Bebert
ATTORNEYS.

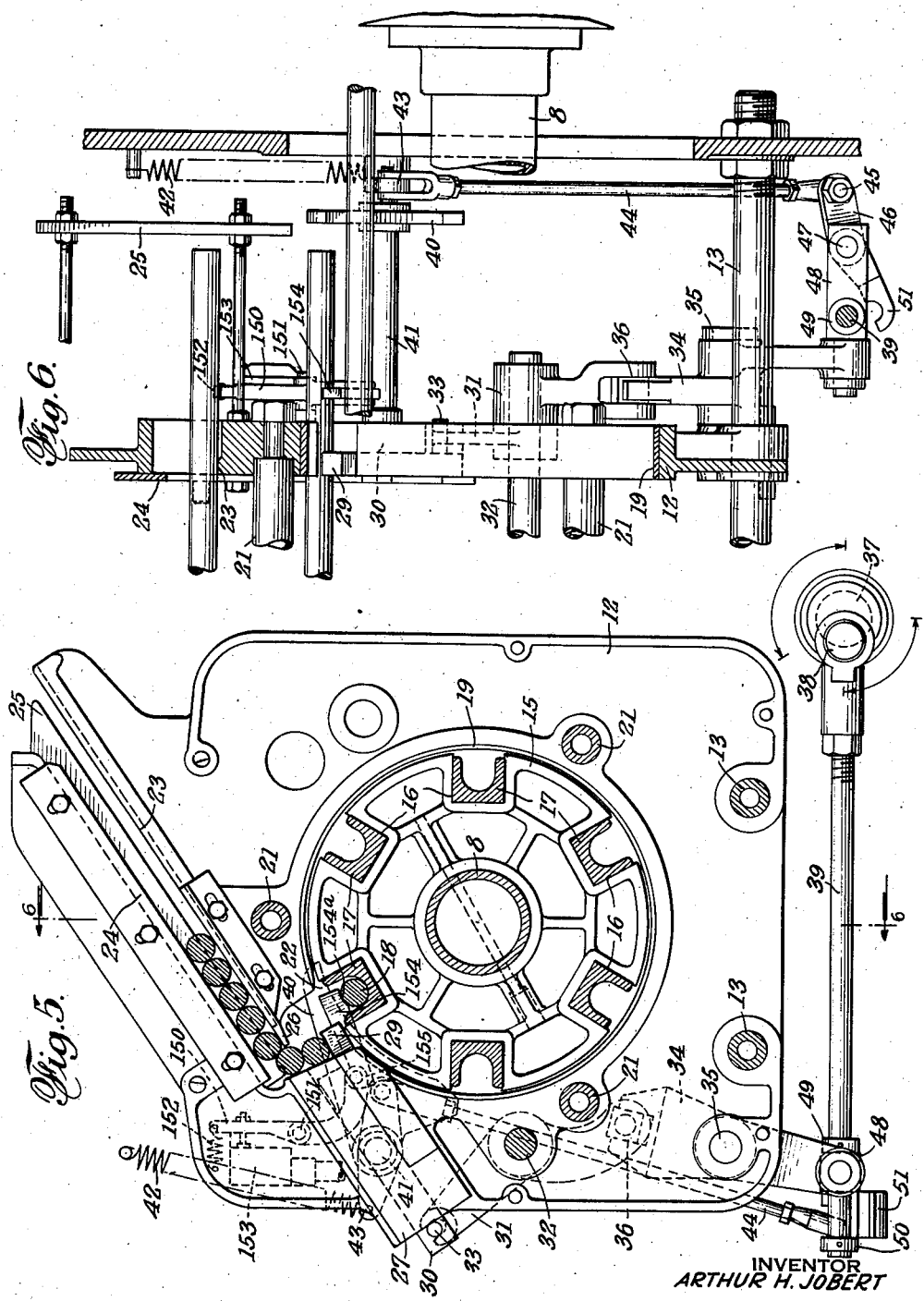

May 25, 1943.   A. H. JOBERT   2,320,039
AUTOMATIC STOCKING MEANS FOR BAR MACHINES
Filed Aug. 13, 1940   10 Sheets-Sheet 5
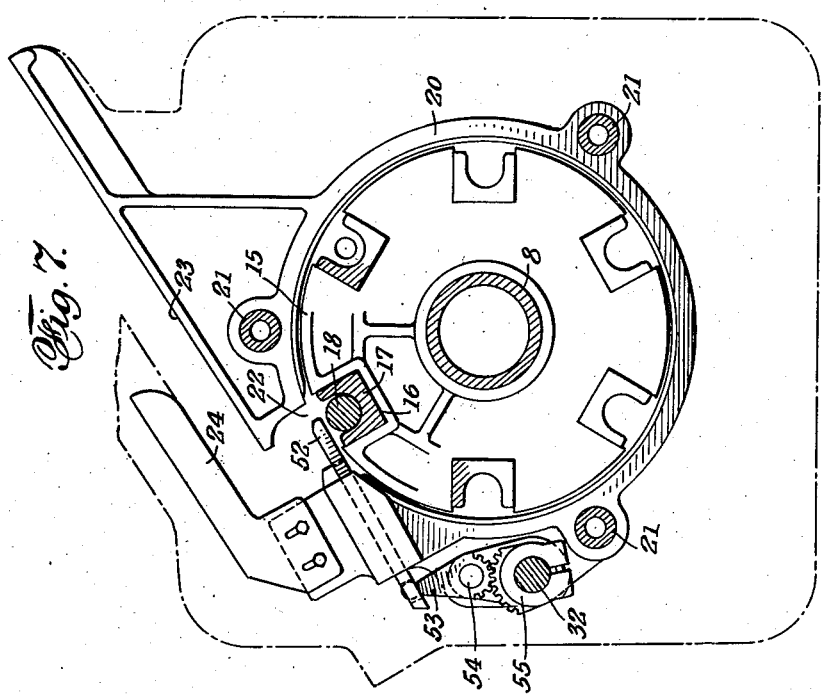
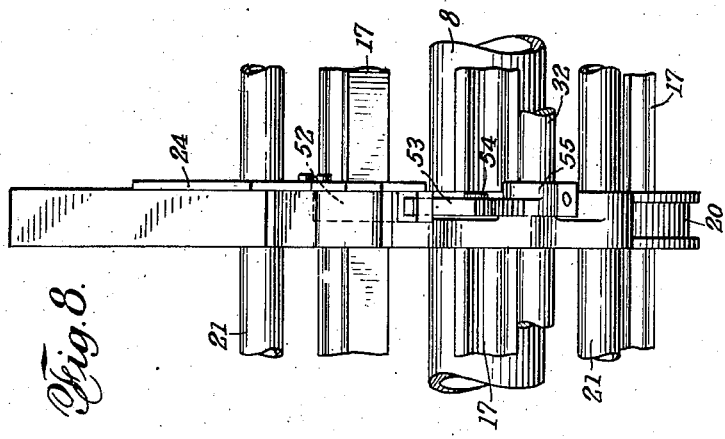
INVENTOR
ARTHUR H. JOBERT
BY
ATTORNEYS.

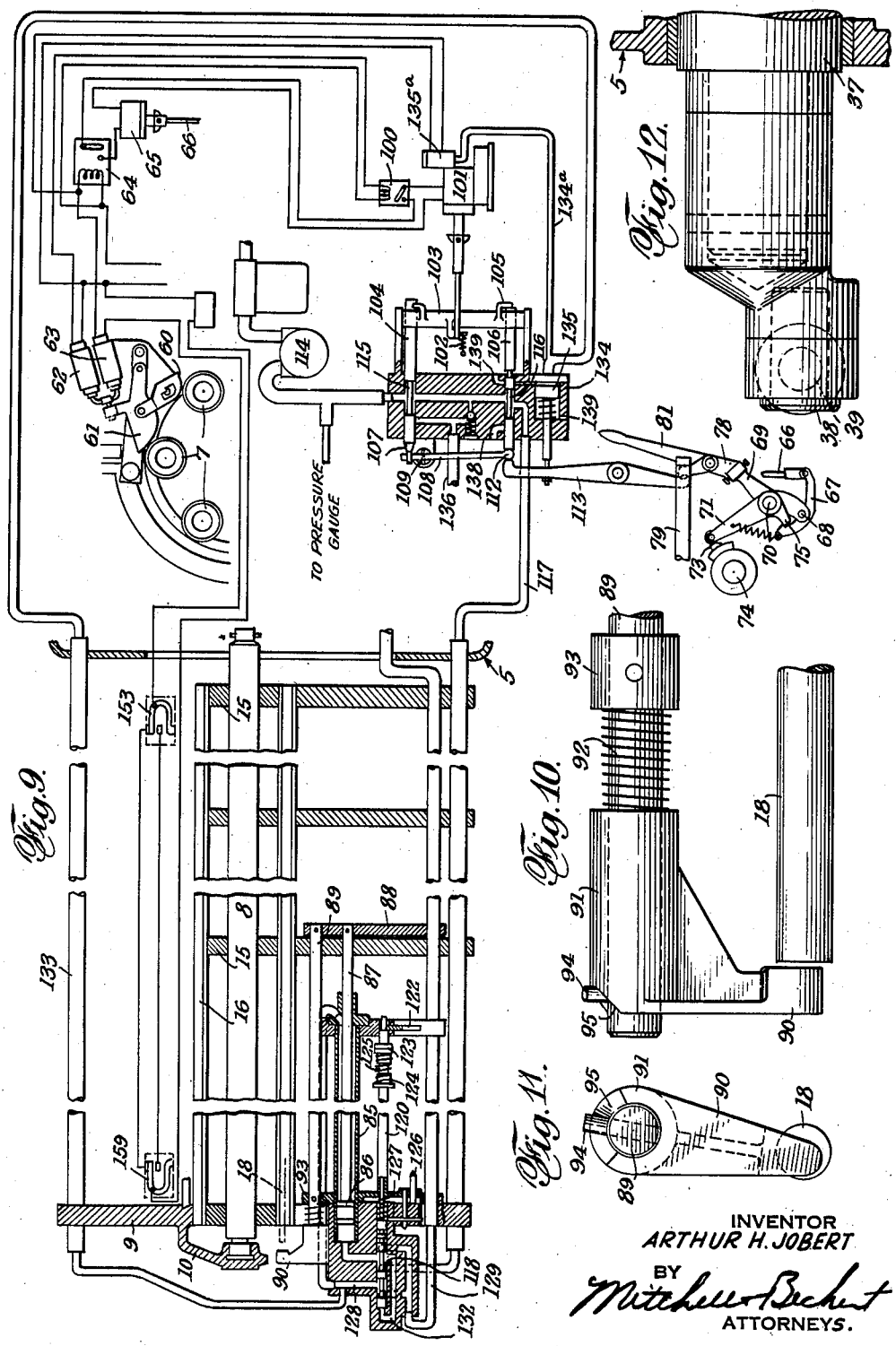

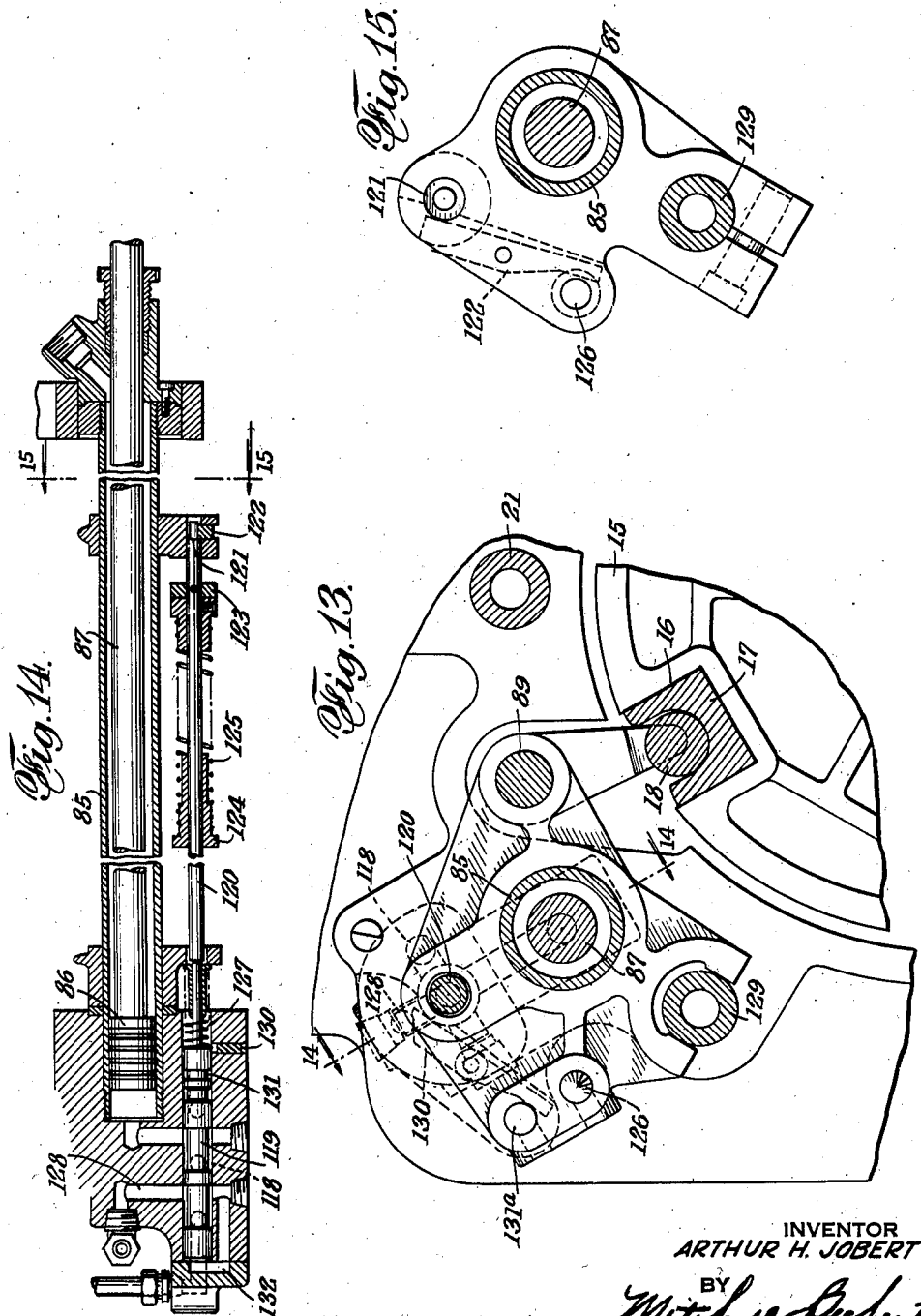

May 25, 1943.  A. H. JOBERT  2,320,039
AUTOMATIC STOCKING MEANS FOR BAR MACHINES
Filed Aug. 13, 1940  10 Sheets-Sheet 8
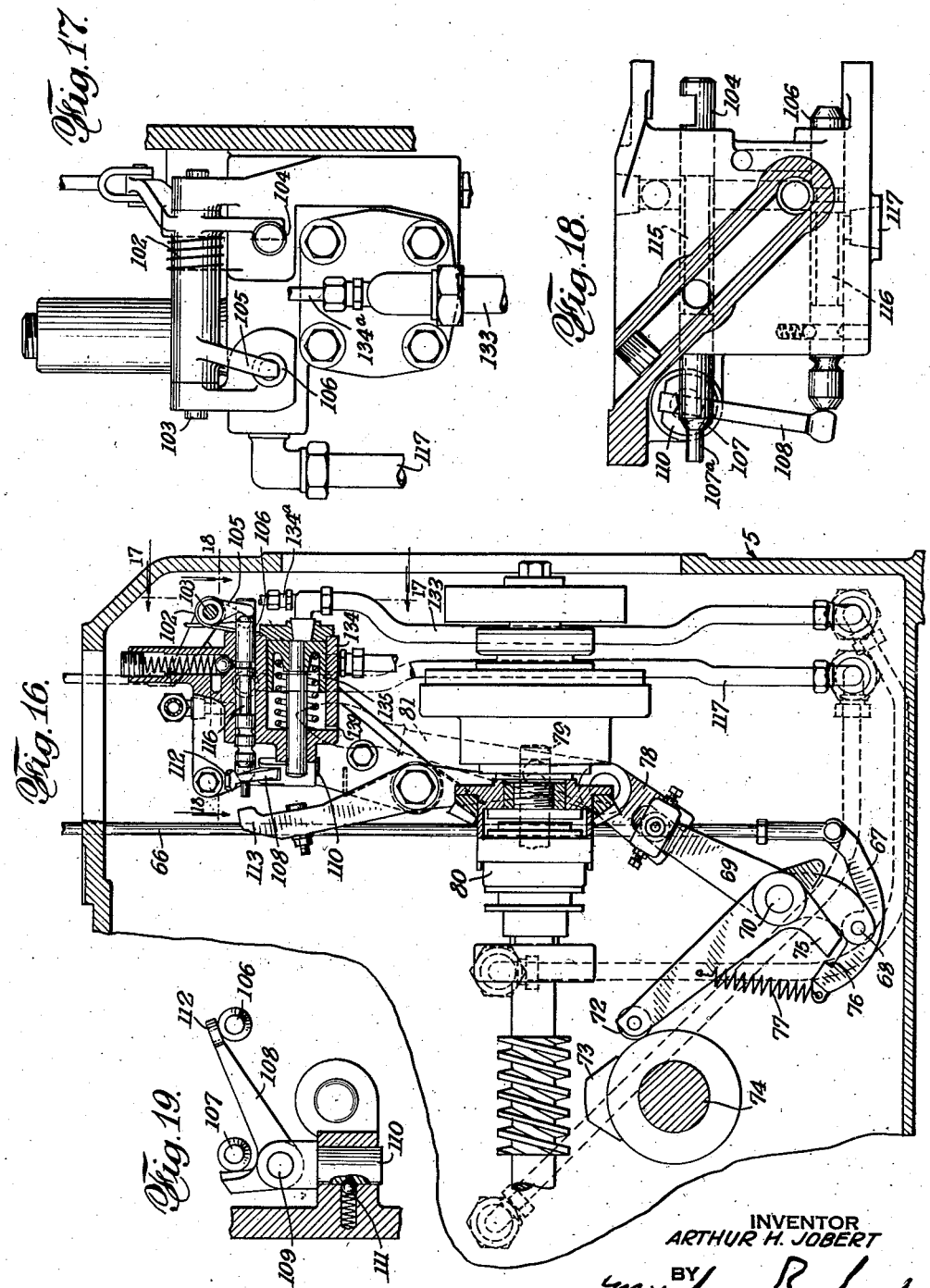
INVENTOR
ARTHUR H. JOBERT
ATTORNEYS.

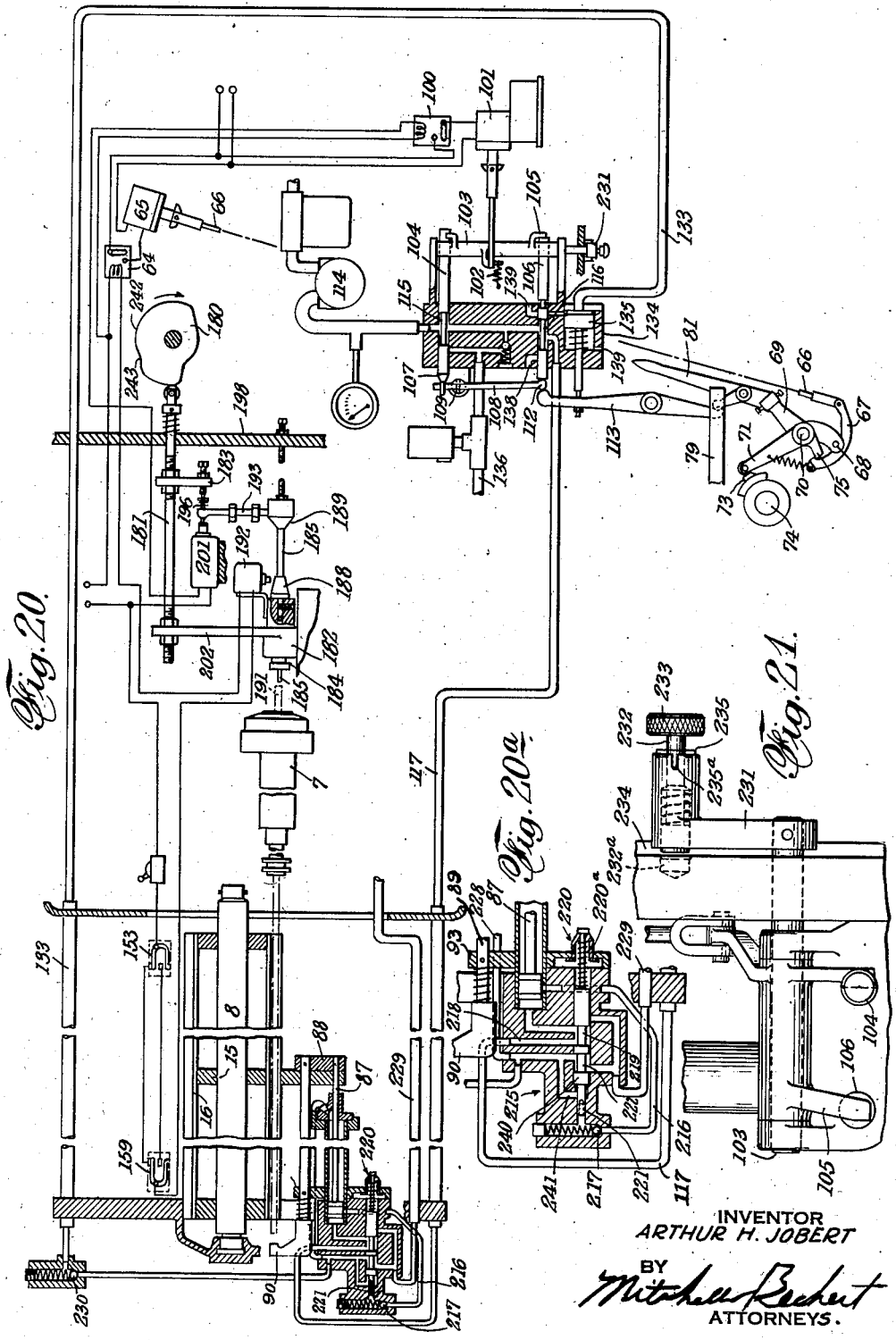

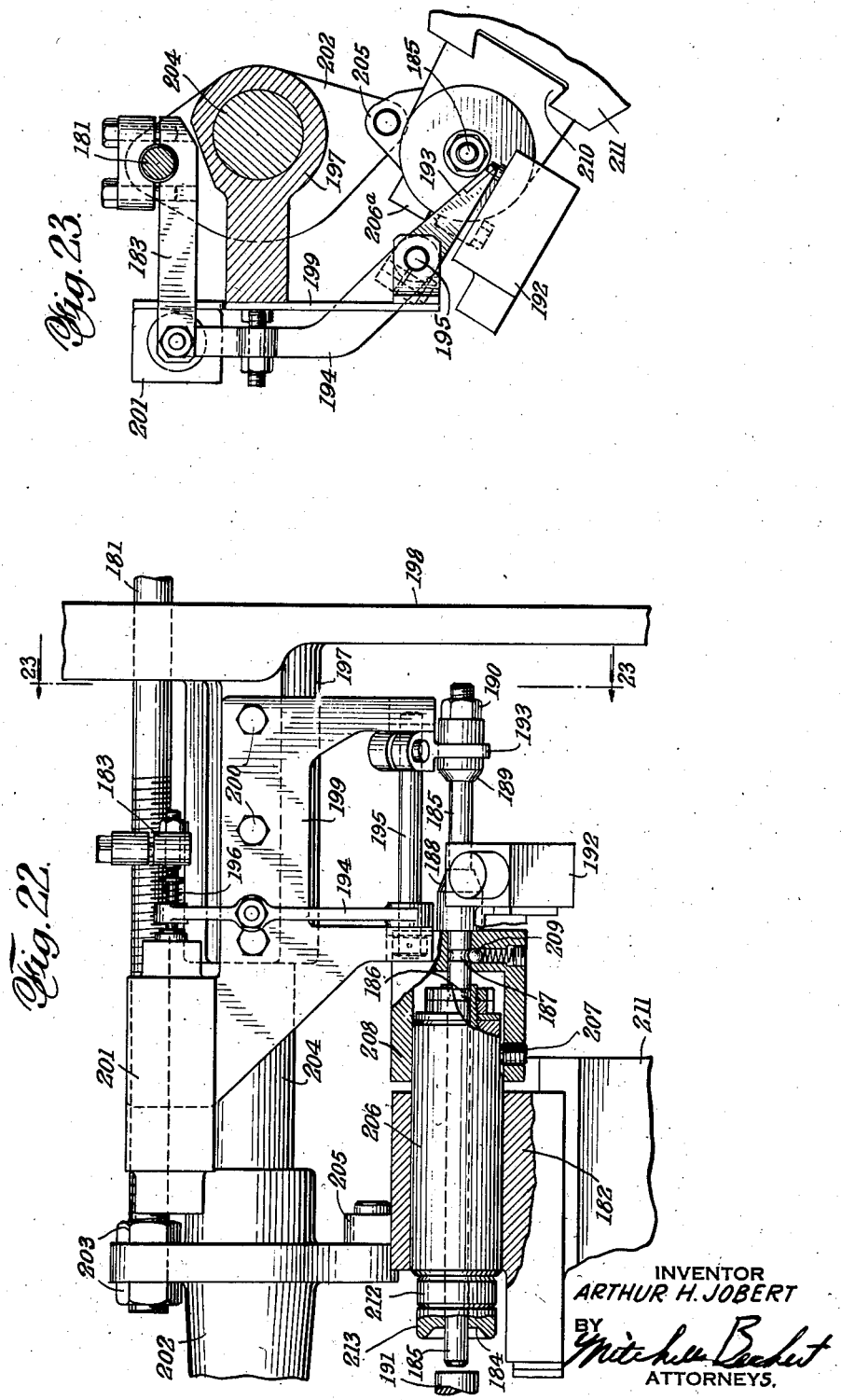

Patented May 25, 1943

2,320,039

UNITED STATES PATENT OFFICE 2,320,039

AUTOMATIC STOCKING MEANS FOR BAR MACHINES

Arthur H. Jobert, New Britain, Conn., assignor to The New Britain Machine Company, New Britain, Conn., a corporation of Connecticut Application August 13, 1940, Serial No. 352,363

29 Claims. (Cl. 29—37)

My invention relates to magazine feed means for automatic screw machines. This application is a continuation in part of my application, Ser. No. 295,014, filed September 15, 1939.

When the piece parts made in an automatic screw machine are relatively long and the time for processing individual parts is relatively short it is obvious that the bars of stock will be consumed in a relatively short time. The time for stocking up is the same regardless of the rate of consumption of the bars, and when the rate of consumption is high it is obvious that the down time of the machine for stocking up is proportionately very high relative to the time the machine is running and processing the long piece parts in short times. The above facts have led to some development work in providing bar replenishing means or magazine feed arrangements for bar machines.

My invention relates to such bar replenishing means or magazine feed arrangement, and it is an object of the invention to provide an improved form of device of the character indicated which will be automatic, reliable and sturdy.

It is another object to provide a device of the character indicated with improved safety devices for preventing jamming of parts in case a bar is improperly deposited or fed.

Another object is to provide improved means for feeding bar stock from a magazine to an indexing stock reel.

A further object is to provide improved means for feeding bar stock from an indexible stock reel to a spindle in which the stock is exhausted.

Another object is to provide means for preventing indexing of the spindle carrier and stock reel until the stock is properly in place.

Another object is to provide improved means for stopping the functioning of the screw machine and initiating the bar feeding means.

Still another object resides in provision of means for preventing indexing of the spindle carrier until after the stock has been fully advanced to the stock stop.

A further object contemplates means for rendering the mechanism for feeding stock from the stock magazine inoperative while the machine is being checked or set up.

Various other objects, including the provision of safety features and features looking to reliability of the machine have been provided and will be hereinafter pointed out or will become apparent to those skilled in the art.

Briefly stated a preferred form of the machine, when embodied in or associated with a multiple spindle automatic screw machine, includes a stock reel indexible with the spindle carrier, together with a magazine for holding a plurality of bars of stock and means for feeding stock from the magazine to the reel as required.

The screw machine goes through its normal functions until a bar of stock is exhausted in one of the spindles. By improved means the feed functions of the screw machine are then stopped, preferably by disengaging the main feed clutch of the screw machine. A new bar of stock from the stock reel is then fed from the reel into the empty spindle and such feed may be for a predetermined distance as determined by the feeding means or up to a stock stop of usual construction. If stock is improperly fed from the magazine to the stock reel in such manner that parts might become jammed, as when the stock reel is indexed, devices have been provided to prevent indexing until the defect has been corrected. When a new bar of stock has been loaded from the stock reel into the desired position in the empty spindle, the normal functioning of the device is such as to reengage the main feed clutch and cause the machine to again function normally until another bar of stock has been exhausted. In the preferred form herein disclosed the stock is fed from the reel to the spindles by fluid pressure actuated means, preferably hydraulic means. Various safety devices are embodied to insure safety to the machine and operator and reliability of operation.

In the drawings which show, for illustrative purposes only, a preferred form of the invention—

Fig. 1 is a side view in front elevation of a magazine feed arrangement associated with a multiple spindle automatic screw machine, parts being removed to assist in the disclosure;

Fig. 2 is a fragmentary view in elevation of parts of a magazine feed arrangement illustrated in Fig. 1 but viewed from the rear;

Fig. 3 is a rear end view in elevation of the magazine feed arrangement of Fig. 1;

Fig. 4 is an enlarged fragmentary detail of parts shown in Fig. 3, showing parts of a safety device;

Fig. 5 is a sectional view taken substantially in the plane of the line 5—5 of Fig. 1;

Fig. 6 is a fragmentary sectional view taken substantially in the plane of the line 6—6 of Fig. 5;

Fig. 7 is an enlarged sectional view taken substantially in the plane of the line 7—7 of Fig. 1;

Fig. 8 is a fragmentary view in elevation of parts shown in Fig. 7 and viewed at right angles thereto;

Fig. 9 is a more or less schematic view of a magazine feed device, together with parts of a screw machine associated therewith;

Fig. 10 is a fragmentary view in elevation of a part of the stock feeding means for feeding stock from the reel into a spindle;

Fig. 11 is a rear view in elevation of parts shown in Fig. 10 and viewed at right angles thereto;

Fig. 12 is a fragmentary view in elevation of the crank means shown in Fig. 5 for feeding stock from the magazine to the reel when required;

Fig. 13 is an enlarged sectional view taken substantially in the plane of the line 13—13 of Fig. 2;

Fig. 14 is a fragmentary sectional view taken substantially in the plane of the line 14—14 of Fig. 13;

Fig. 15 is a sectional view taken substantially in the plane of the line 15—15 of Fig. 14 and illustrating a latch mechanism;

Fig. 16 is a fragmentary sectional view through the screw machine illustrating certain of the hydraulic bar feed equipment and associate feed clutch mechanism;

Fig. 17 is a sectional view taken substantially in the plane of the line 17—17 of Fig. 16;

Fig. 18 is a sectional view taken substantially in the plane of the line 18—18 of Fig. 16;

Fig. 19 is a sectional view taken substantially in left-hand side elevation of a lever and its mounting;

Fig. 20 is a more or less schematic view similar to that of Fig. 9 and incorporating various modifications;

Fig. 20ª is an enlarged fragmentary view of the hydraulic feed circuit shown in Fig. 20;

Fig. 21 is a detailed elevation of means for rendering inoperative certain parts of the feed mechanism;

Fig. 22 is a detailed elevation of the means associated with the stock stop and shown schematically in Fig. 20; and Fig. 23 is a right-end elevation of the apparatus shown in Fig. 22 and taken substantially in the plane 23—23.

The invention will be described as embodied in or combined with a multiple spindle screw machine, generally designated 5, which includes an indexible spindle carrier 6 carrying a plurality (in this case 6) of rotatable spindles 7. A detailed showing of and description of the screw machine is thought to be unnecessary since such screw machines and their usual operation are well understood.

The stock reel, which is supported at the rear end of the screw machine and is indexible with the spindle carrier, preferably includes a central arbor or shaft 8 which is provided with suitable means (Fig. 9) for attachment to the indexible spindle carrier 6 so that as the spindle carrier is indexed the stock reel indexes with it. The central arbor 8 being carried by the rear end of the spindle carrier is supported thereby. At the opposite or rear end of the stock reel there is a rear frame plate 9 having a bearing 10 for the rear end of the central arbor or tube 8. In addition to the rear frame plate 9 there are other frame plates 11—12, all of the plates 9, 11 and 12 having longitudinally extending bars 13—13 secured thereto, which bars are supported on pedestals 14 which are preferably adjustable as to height and serve to support the entire stock reel assembly at suitable intervals along its length. The central reel tube or arbor 8 carries a plurality of spaced apart spiders 15—15 rigidly secured thereto. Each spider has a plurality of generally radially inwardly extending grooves or notches 16 therein, the number of grooves being the same as the number of spindles and the grooves being in alignment with the spiders. In the grooves or notches 16 in the spiders are preferably secured longitudinally extending bar guides 17 rigidly mounted in the notches 16 so that bars of stock, such as 18, may be supported in the grooves of such bar guides 17 and thus held at all times in substantial alignment with the spindles. There is little opportunity for the stock bar to whip since they are thus quite fully supported substantially throughout their length. The bar guides 17 may be made of or lined with suitable sound deadening material to reduce noise during operation. The frame plates, such as 9, 11 and 12, have formed therein or carry annular sound deadening liners 19, providing a free running fit with the outsides of the spiders 15 so as to hold the bars of stock in place in the reel. In addition to the annular ring plates 19 of the main frame plates there are preferably additionally spaced ring plates such as 20—20 (Figs. 1, 2, 7, 8) supported on longitudinally extending supporting bars 21—21 secured to the frame plates such as 9—11—12. The ring plates 20 surround the stock reel and serve as additional supports for the stock in the reel.

All of the ring plates or annular guides surrounding the stock reel for holding the stock in place are provided with through notches 22 for permitting a bar of stock to drop through and into the bar guides 17 when the latter are positioned beneath such slots or notches 22. Adjacent the entrance slots through the annular guide rings there is a magazine for holding a plurality of bars of stock which are fed one at a time into the stock reel. The magazine may include inclined ways 23—24 (Fig. 5), one of which is adjustable relatively to the other so as to confine the bars of stock in single file. The ends of the magazine may be closed so that stock of definite length may be placed in the magazine and be held therein. One end of the magazine, such as the rear end, may be closed by an integral closure (Fig. 3) and the other end by means of an adjustable end plate 25. Any suitable number of magazine rod guides may be provided so as to adequately support the stock prior to admission thereof to the stock reel. At the outlet point of the magazine at spaced apart points thereon there are adjustable plates 26 which may be adjusted so as to allow only one bar to pass between the end of such plate and the base portion 27 of the magazine, as will be clear from Fig. 5. The base plates 27 are provided with bar rests or supports 29 upon which a bar of stock from the magazine may rest. Such bar rests 29 are preferably grooved out slightly on top or inclined in such a manner as to retain the bar of stock thereon. By means to be described the bars of stock are pushed or forced off of the rests 29 and are allowed to fall into the appropriate stock guide which has been indexed into position beneath the entrance slots 22 and held in such position between indexes.

In the form shown the bar of stock resting upon the bar rests 29 is forced off and into an empty bar guide by mechanical means and a new bar from the magazine then falls by gravity onto the bar rests 29 until another bar is required in a bar guide of the reel. It is to be understood that as many bar rests 29 are used as may be required to adequately support the stock. Such rests may be provided on all of the frame plates 9—11—12 and it is desirable to have the bar stock mechanically pushed from those rests substantially at the same time. In the form shown (Figs. 5 and 12) the bar stock feeders or pushers, designed to force the bar stock off of the rest 29, may include stock pushers or bars 30, slidably mounted in the frame parts 9—11—12 or by other means adjacent the bar rests. Each of the pusher bars 30 is actuated by a lever 31, fixedly secured to a shaft 32 which extends between the forward and the rearmost stock pushers. The lever 31 is engageable with the pusher bar 30 as by means of a forked upper end engaging over pin 33 on the pusher bar. The lower end of one of the lever 32 is pivotally connected to a lever 34, which is itself mounted about a pivot shaft 35 on one of the frame members. The lower end of the lever 31 carries a block 36, which may slidably fit in between slideways on the upper end of the lever 34, as will be understood. Thus, when the lever 34 is rocked in a counterclockwise direction it will be seen that the pusher bar 30 will be moved upwardly and toward the right as viewed in Fig. 5, to force the bar of stock resting on the bar rests off and into the empty bar guide 17 positioned therebeneath. In order to actuate the pusher bars 30 so as to force a new bar of stock into the reel, I preferably employ means actuated mechanically from a screw machine shaft which is timed to operate at a definite time during that part of the cycle when the stock reel is at rest between indexing movements. In the form illustrated (Figs. 5 and 12) and main crank shaft or shaft 37 operating in timed relation therewith is provided with a crank pin 38 upon which is mounted a connecting rod or link 39. During the normal operation of the machine the shaft 37 operates and the link 39 reciprocates without having any effect on the lever 34 and consequently no bar of stock is pushed from the stock rests. However, when a bar of stock is required, that is, when an empty stock guide 17 approaches the point beneath the entrance slot 22, the mechanism is set into action to feed a new bar and such mechanism is automatically actuated by the following means. Adjacent the forward end of the stock reel there is a link shoe 40 (Figs. 5, 6) carried by a pivot shaft 41 on the frame. The shoe has a long arcuate bearing surface, as shown in dotted lines in Fig. 5, the length being sufficient to normally span the distance between two adjacent stock bars in adjacent stock guides in the reel. Thus, so long as there is stock in the reel the bars themselves will engage beneath the arcuate surface of the shoe 40 and hold the same in elevated position, as shown in Fig. 5. However, should the bar of stock be so far consumed by the screw machine 5 as to pass forwardly beyond the plane of the shoe 40, the latter will not be engaged by a bar of stock, there being no stock in that particular stock guide and the shoe 40 will drop. Such dropping of the shoe rocks the pivot shaft 41 in a clockwise direction and such rocking may be assisted by a tension spring 42, carried by one end of a lever 43, fixedly carried on the pivot shaft 41. The opposite end of the lever 43 has pivotally secured thereto a link 44, which at its lower end is pivotally secured at 45 to a lever 46. The lever 46 is pivoted at 47 to a block 48, which is pivotally secured to the lever 34, which rocks the stock pushers 30 as heretofore described. The connecting rod or rods 39 driven by the machine shaft 37 passes through the block 48, as will be clear from Figs. 5 and 6, and the connecting rod has spaced apart collars 49—50 fixed thereon. The normal throw of the crank is such that ordinarily the connecting rod 39 slides through the opening in the block 48 and the collars 49—50 do not travel sufficiently far to actuate the block 48. However, when the stock in one of the stock guides of the reel is exhausted and the shoe 40 thus permitted to fall, the connecting link 44 is forced downwardly, thus forcing the wide end 51 of the lever 46 in between the block 48 and the collar 50 on the end of the connecting rod 39. As stated, the shaft 37 acts in timed relation with the other feed functions of the machine and when the reel has been indexed to a position such that the empty stock guide is stopped beneath the magazine, the crank actuates the link 39 so as to draw it toward the right and thus cause the collar 50 acting through the wide end of the lever 51 to move the block 48 to the right as viewed in Fig. 5, so as to rock the levers 34—31 and thus force the pusher bar 30 inwardly to force a bar of stock resting upon the bar rests 29 off into the space above the empty stock guide and the bar will fall into place. Continued movement of the crank 38 will again move the levers 34—31 and the pusher bar 30 back to its normal position as shown in Fig. 5, and upon the next indexing movement, if there is a bar of stock on the incoming stock guide, the shoe 40 will again be raised so as to move the wide end 51 of the lever 46 out of the path of movement of the collar 50 and no further stock will be fed into the reel until an empty stock guide again arrives beneath the shoe 40. As stated, there may be as many pusher bars 30 as there are stock rests 29 and the shaft 32 preferably extends along the stock reel and pivotally carries additional levers similar to the lever 31, which upon rocking of the shaft 32 will force in the additional stock members so as to dislodge the stock from the rests and permit it to drop onto the stock guides of the reel.

The bar stock in the reel is prevented from whipping at all stations except the loading station by the spider housings 9, 11 and 12 and guard rings 20. At the loading station I provide other means to prevent whipping of the stock at that station. Such means may include slidably mounted stop fingers 52 (Fig. 7), slidably carried by the intermediate annular rings 20—20 and normally positioned inwardly, as shown in Fig. 7, so as to overlie the open slots of the stock guides and thus prevent whipping of the stock. The fingers 52 when projected could also prevent a bar on the stock rests from sagging into the stock guide of the reel. The stop fingers 52 may be pivotally secured at their rear ends to levers 53, pivotally mounted at 54 on the ring guides 20. The levers 53 may be toothed and mesh with a similarly toothed surface on a lever or gear 55 carried by the shaft 32. Thus when the shaft 32 is rotated as heretofore described to cause the stock pushers 30 to force a bar of stock off of the stock rests 29, due to the interposition of the two levers 53—55, the stop fingers 52 will be withdrawn so as to permit a bar of stock at the proper time to drop into the reel. As soon as the stock pushers 30 are retracted to the position shown in Fig. 5, the stop fingers 52 are projected as shown in Fig. 7 and such are the normal positions of the parts when the stock reel is full and the machine operating normally.

The bar stock passes from the magazine into the reel between indexing movements thereof at the station, as shown in Fig. 5. The reel indexes in a clockwise direction and as the reel continues to index and before a bar of stock just loaded into the reel again reaches the zone of the shoe 40 the rear end of the stock is engaged by a cam 55ª (Figs. 2, 3), carried by the rear frame 9 and designed to push the bar stock forward to a slight extent, so that when the loaded bar of stock reaches the zone of the shoe 40 it will be projected sufficiently toward the screw machine to be positioned beneath the shoe 40, so as to maintain the same in raised position. Thus whenever a bar of stock has been step fed into the screw machine by the usual screw machine feed mechanism to such an extent that the rear end of the bar passes forwardly beyond the zone of the shoe 40 a fresh bar of stock will be fed when the empty stock guide reaches the station beneath the magazine, as shown in Fig. 5. No matter whether the stock is exhausted from only one spindle or from all of the spindles, a fresh bar of stock will be positioned in the reel when the empty bar guide of the reel reaches the station illustrated in Fig. 5.

As stated above, when a bar of stock has been step fed by the screw machine until the rear end thereof passes beyond the zone of the shoe 40, a fresh bar of stock is fed to the reel in the bar guide in alignment with that particular spindle. However, the screw machine continues to operate until the old bar in the spindle is used up to the desired extent, usually until no further piece parts can be made therefrom. When the bar in the screw machine has thus been used up the screw machine is stopped and the fresh bar, previously loaded into the reel, as heretofore described, is then fed from the reel into the screw machine by means to be later described. The mechanism for stopping the screw machine when a bar of stock in any spindle has been exhausted may be substantially like that disclosed in Montgomery-Retz Patent No. 2,159,398, some of the features of that patent being illustrated in Fig. 9. As is more particularly set forth in said patent, when a bar of stock is exhausted from the spindle the feed tube thereof is forced into position so as to engage beneath the latch plate 60, thus permitting the contact shoe 61 to fall and break the circuits through the switches 62—63. Breaking the contact through the switch 63 will cause the relay 64 to deenergize the solenoid 65 and permit the latch link 66 to drop and rotate the latch lever 67 (Fig. 16) on its pivot 68 in a clockwise direction. The latch 67 is pivoted at 68 to a lever 69 which, as will be described, controls the main feed clutch of the machine. The lever 69 is pivoted on a stub shaft 70 on the machine frame. The shaft 70 also pivotally carries a lever 71, having a roller 72 in position to be engaged by a cam 73 on the main cam shaft or a shaft 74 operating in timed relation therewith. The lever 71 has a projection 75, to be engaged by the latch portion 76 of the latch lever 67. A spring 77 serves to urge the latch lever so as to engage the latching portions 75—76. The cam 73 is positioned on the cam shaft 74 in such angular relationship that when the last piece part is completed in the spindle from which the stock has been exhausted, the piece part is cut off and the chuck opened before the roller 72 is engaged. At that time the cam 73 engaging beneath the roller 72 rocks the lever 71 in a clockwise direction and through the latch lever 67 rocks the lever 69 clockwise, which in turn rocks the lever 78 in a counterclockwise direction, to urge the clutch release rod 79 toward the left as viewed in Figs. 9 and 16, and thus disengage the main feed clutch 80. When the latch lever 67 is in latching position and the cam 73 has caused disengagement of the main feed clutch the handle 81 cannot be actuated so as to reengage in the main feed clutch until such time as the latch lever 67 is moved to its unlatched position, so as to free the lever 69 from the latch 70 being held in rocked position by the cam 73.

After the feed functions of the machine have thus been stopped by disengagement of the main feed clutch the fresh bar of stock previously loaded into the stock reel and in alignment with the spindle from which stock has been exhausted is fed forward and the forward end may serve to eject the butt end of the exhausted bar from the collet and the fresh bar may be forced out against the stock stop, but preferably will be forced out but a short distance where the end may be trimmed, so as to provide a proper end for the first piece part on such bar.

In the form shown I employ fluid pressure actuated means, preferably hydraulic, for feeding the fresh bar from the reel to the spindle and preferably employ hydraulic means for again throwing in the main feed clutch when the bar of stock has been fed to the spindle.

As shown (Figs. 9, 10, 11, 13, 14 and 15) the frame of the reel carries a cylinder 85, having a piston 86 therein and a piston rod 87 projecting from the cylinder. The piston rod 87 is secured to a main crosshead 88, suitably guided in the frame and preferably on one of the pipes for carrying the exhaust fluid. The crosshead 88 has secured thereto a drawbar 89 which, at its rear end, carries the feed finger 90 in position to engage the rear end of the bar of stock in the reel in alignment with the spindle from which stock has been exhausted and which is located in the loading station. The feed finger 90 is preferably formed as an extension from a cylindrical sleeve 91, slidably carried on the drawbar 89 and spring pressed rearwardly by means of a spring 92, interposed between the collar 93 and the sleeve 91. The drawbar 89, in the form shown, carries a fixed cross pin 94 and the rear end of the sleeve is provided with a generally V-shaped cam-like slot 95, which engages the pin 94 and under the influence of the spring 92 acts to center the feed finger 90 in alignment with the slot of a stock guide in the reel and, of course, in alignment with the rear end of the stock bar carried thereby. In case the feed finger 90 should be positioned in the slot of the stock guide of the reel when the latter is indexed, no damage to the feed finger can result, since it simply rocks with the stock reel and rocks the entire feed finger about the drawbar 89. As soon as the feed finger is free of the stock guide in the reel, the spring 92, acting against the sleeve 91, serves to cause the cam surface 95 on the latter, acting on the pin 94, to cam the feed finger back into normal position.

The means for feeding a bar from the reel to a spindle will now be described.

The parts of the valve mechanism as illustrated in Figs. 9 and 14 are positioned so as to cause the piston 86 to be advanced for feeding a bar of stock.

The parts are so positioned by the following means:

When the bar stock is exhausted in a spindle, the circuit through the two switches 62—63 (Fig. 9) will be broken as heretofore described. The switch 62 controls the relay 100 of solenoid 101. When the solenoid 101 is deenergized the spring 102 acting on the projecting arm rotates shaft 103, which by means of another projecting arm moves spool valve 104 in the right-hand direction as viewed in Fig. 9. The shaft 103 has another projection 105 which when the solenoid is deenergized simply moves away from the end of reversing valve 106. Valve 106 has been moved to the position shown in Fig. 9 by means of a clutch throw out mechanism, as will be described. When the valve 104 is withdrawn toward the right, its cam nose 107 (see also Fig. 19) is withdrawn from engagement with and releases a lever 108 which is pivotally mounted at 109 on a stub shaft 110 rotatably mounted in a bearing on the frame. A resilient detent 111 tends to hold the shaft 110 and lever 108 in normal running position as shown in Fig. 19. The lever 108 has a head 112 thereon which when it drops down upon release of lever by the cam nose 107 positions itself and is held by the detent 111 and reduced portion 107ᵃ (Fig. 18) of valve 104 between the forward end of the reversing valve 106 and a swinging lever 113, the lower end of which is moved toward the left when the clutch shift rod 79 is moved in the clutch disengaging direction. Thus as soon as the contact is open through switch 62 upon a run out of stock, the spool valve 104 is moved so as to cause the cam nose 107 to disengage the lever 108, permitting it to fall down into position and when the main feed clutch is later disengaged the lever 113 is rocked and the top end engaging the head 112 causes the latter to shift the reversing valve 106 toward the right which is the position shown in Fig. 9. It may be here stated that so long as the machine is operating normally and the cam nose 107 engages the lever 108 so as to hold it in its out of the way position as shown in Fig. 19, the lever 113 may swing freely when the clutch is thrown out, for example, by hand, and the reversing valve 106 will not be affected because the travel of the upper end of the lever 113 is insufficient to move reverse valve 106 except when the enlarged head 112 is interposed between them.

Now, with the parts as shown in Fig. 9, pressure fluid from a suitable source, for example the hydraulic pump 114, passes around the neck 115 of the spool valve 104, thence downwardly past the neck 116 of reverse valve 106 and then through conduit 117 to the port 118 of the cylinder control valve (Figs. 9 and 14). From port 118 pressure fluid passes the neck 119 of the control valve and enters the cylinder at the head end of the piston thus driving piston rod 87 and cross-head 88 toward the right as viewed in Figs. 9, 14 so as to cause the stock feed finger 90 to engage the bar of stock and feed the same into the empty spindle and a predetermined distance therebeyond. The control valve has a long valve rod 120 projecting from the valve block and the end has a shoulder 121 engageable with a latch 122 carried by a fixed part of the reel frame. The valve rod carries a fixed collar 123 and a slidable collar 124 with a coil spring 125 interposed therebetween. A moving part of the rod feeding mechanism, for example the rod 89, carries a cross-head member having a projecting pin 126 adjustably carried therein. When the stock has been fed the desired distance as determined by the proportions of the parts and the adjusted position of the pin 126, the latter engages a tail of the latch 122; and the spring 125, which has been compressed by contact between the cross-head member and collar 124 quickly shifts the entire control valve toward the right. This shifting of the control valve serves to compress a coil spring 127. When the control valve is shifted to the right, the high pressure fluid is cut off by the control valve from the head end of the piston 86 and connected through passage and conduit 128 to the tail end of the piston; and fluid in the cylinder on the head end of the piston is exhausted through the valve passages and pipe 129 back to the sump.

When the control valve is shifted to the right a latch 130 falls into the neck 131 of the control valve and latches the same in right-hand position against the force of the compression spring 127. The cross-head 88 and stock feed finger 90 then return to the left-hand position and a latch release pin 131ᵃ, carried by a part of the auxiliary cross-head, releases the latch 130 but the spring 127 cannot yet return the control valve to its left-hand position by reason of the fact that high pressure fluid through passage 132 has built up a pressure on the head end of the control valve and retains it in its right-hand position against the force of the spring 127. Furthermore, high pressure fluid which has served to move the piston 86 back to its left-hand or rearmost position builds up in passage 128 and conduit 133 and enters the head end of the cylinder 134 (Figs. 9, 16) having the clutch engaging piston 135 therein. The pressure fluid, acting on the head of piston 135, tends to move it toward the left, so as to rock the lever 113 for reengaging the main clutch. However, it will be understood that the main clutch cannot be reengaged so long as the latch parts 75—76 (Fig. 16) are engaged. I therefore provide a branch connection 134ᵃ from conduit 133, which leads to a pressure switch 135ᵃ which is set for low pressure differential. Thus, upon the first build-up of pressure in line 133 the pressure switch 135ᵃ is closed, and the closing of that switch, as will be clear, closes the relay 64 of the solenoid 65 and disengages the latch parts 75—76 so that, upon further building up of pressure in line 133 the piston 134 will be moved and the lever 113 will be rocked, so as to reengage the main clutch. After the clutch has been reengaged the spindle carrier and reel index in the normal manner and the switches 62—63 are again closed by the feed spool of the next spindle having a bar of stock engaging beneath the contact shoe 61, as is more fully set forth in said Montgomery-Retz patent. The closing of the switches 62—63 closes the relay 100 of the solenoid 101 and, of course, closes the relay 64 of the solenoid 65, to maintain the latch parts 75—76 disengaged. When the solenoid 101 is thus reenergized the shaft 103 is rocked and the spool valve 104 is moved toward the left so as to cause the cam nose 107 to rock the lever 108 out of the way of the end of lever 113. Also, movement of the valve 104 to the left cuts off the supply of high pressure fluid to the line 117 and through the neck 115 puts the source of high pressure fluid into communication with the conduit 136, which is connected to the lubricating system of the machine. When the shaft 103 is rocked the projecting arm 105 engages the right-hand end of the reverse valve 106 and opens communication between the pipe 117 and a discharge passage 138, and at the same time opens a discharge passage 139 to the head end of the cylinder 134, thus permitting the spring to return the piston 135 to its right-hand position, as shown in Fig. 9.

The machine then goes on with its normal operations until such time as another bar of stock is exhausted in one of the spindles, at which time the various operations heretofore described will be repeated and the stock in the empty spindle will be replenished.

It should be understood that during normal operation of the machine the feed clutch may be thrown in and out at will by means of the handle 81 without in any way affecting or altering the various hydraulic or electrical connections designed to make bar replenishment an automatic operation.

The machine will ordinarily operate as heretofore described, the stock being replenished when required. However, it would at times be possible for bar stock to be jarred loose from the stock rests 29 so that a new bar of stock might fall down onto a part of a bar left in the reel or into a partially empty stock guide in the reel and upon an indexing motion of the machine jamming of parts and damage might result. I have devised means for preventing indexing of the machine in case a bar of stock should jar loose and one end should fall into or partially into a partly empty stock guide or onto a bar of stock already in the guide. In one form of safety device of the character indicated and as shown particularly in Figs. 3, 4, 5, 6 and 9, I provide on the front reel frame a switch lever 150, pivoted to the frame at 151. The lever 150 is urged in a counterclockwise direction by means of a coil spring 152; and, when in the normal position shown in Fig. 5, the double contact switch 153 is closed, a double-contact switch referring to that type of contactor which will make one circuit when in the "in" position and another circuit when in the "out" position, as illustrated diagrammatically in Fig. 9. The lower end of the lever 150 has a finger member 154 pivoted thereto and is provided with a shoulder in position to abut a shoulder on the lever 150, as indicated at 155. Thus a clockwise tipping of the finger 154 would cause the shoulders to engage each other and cause the clockwise swinging of the lever 150 so as to break one contact and make the other contact of the two contact switch 153. Normally the finger member 154 will rest on top of a bar of stock in the reel, as will be clear from Fig. 5. On the rear frame of the reel there is provided another lever 156 (Fig. 3), pivoted at 157 on the frame. This lever is urged counterclockwise by a spring 158 and when in the normal position shown in Fig. 3 one contact of the double contact switch 159 is made. However, when the lever 156 is swung in a clockwise direction the last mentioned contact is broken and another contact made. Such abnormal position of the lever 156 is as shown in Fig. 4. At the bottom of the lever 156 there is a finger member 160, pivotally mounted to the lever 156 at 161. Shoulder means 162ª are provided so that should the finger member 160 swing downwardly the shoulders will engage each other and cause the lever 156 to be swung in a clockwise direction. The bottom of the finger member 160 also normally rests on top of a bar of stock in the reel if such a bar is in place. The top forward end 162 of the finger member 160 is provided with a slanting or cam surface so that if a bar of stock as shown in Fig. 4 falls down on the surface 162, the finger member 160 will be cammed downwardly toward the left and cause a swinging of the lever 156 for breaking one contact and making another in the double contact switch 159. As will be clear from Fig. 9, the pair of double contact switches 153—159 are in circuit with the switch 63 controlled by the latch means 60—61, as heretofore described. Now when both upper contacts of the switches 153—159 are closed, as shown in Fig. 9, or when both lower contacts of those switches are closed, the circuit to switch 63 will be uninterrupted, but if, say, the upper contact of the rear switch 159 be opened and the upper contact of the forward switch 153 be closed, the circuit through the switch 63 would be opened, which opening in turn would open the relay 64, thus deenergizing the solenoid 65, thus dropping the latch mechanism shown in Fig. 16, so as to prevent reengagement of the main clutch when that clutch is already open, or causing disengagement of the main clutch upon the appropriate rotation of the shaft 74, as heretofore described. Therefore, if an extra bar of stock should fall down, the rear contact switch 159 would be actuated by reason of the leftward camming of the finger 160 when it rests on a bar as 18, or by the clockwise swinging of the finger 160 and through shoulders 162ª of the lever 156 when there is no bar as 18 beneath the finger 160. The forward switch 153 would be unaffected due to the fact that the extra bar would simply rest on top of the finger member 154 without moving it. Under those conditions the main feed clutch would be disengaged or, if already disengaged, could not be reengaged until the extra bar of stock had been removed. It will be clear that when there is no stock in the reel in the station beneath the magazine feed arrangement, a bar of stock pushed off the stock rests 29 would fall down on the finger members 154—160 and both switches would be rocked, thus breaking both upper contacts and making both lower contacts. However, if both lower contacts are made the circuit is not interrupted and even though there be a momentary interruption of the circuit at the time the switches 153—159 are actuated, the momentary actuation of the latch mechanism of Fig. 16 would not have any effect on the clutch release mechanism. When a bar is normally in position the machine operates as usual and if a fresh bar has forced the levers of switches 153—159 so as to make the bottom contacts and break the upper contacts, such contacts are reversed as soon as the index starts and the finger members 154—160 are permitted to return to normal positions.

Briefly, the operation of my improved device as above set forth is as follows:

The magazine is loaded by hand and the screw machine started in operation. The first empty stock guide in the reel to reach the magazine loading station will be filled at that station and each subsequent empty stock guide will likewise be filled; also, the first bar to reach the loading station is fed through the spindle, the operation being repeated at each index until all spindles have been stocked up. When a spindle has used up a complete bar and the last piece part has been made and the collet opened by the usual screw machine mechanism, the main feed clutch is disengaged and through the hydraulic mechanism described a fresh bar of stock is fed from the reel to the spindle. Thereafter, the feed clutch is reengaged and the usual cycle of the screw machine proceeds. Whether the bars are exhausted successively or at random is immaterial because a bar of stock is fed from the magazine to the reel each time the old bar has been step fed from the reel a sufficient distance to clear the contact shoe 40, and each time the last piece part has been made from a bar in the screw machine a new bar already aligned therewith in the stock reel is fed into the spindle.

In accordance with a further feature of my invention I provide means for assuring that the spindle carrier will not be indexed unless the stock has been properly fed up to a stock stop. A preferred means is shown schematically in Fig. 20 and certain features illustrated in detail by Figs. 22 and 23.

Referring to Fig. 20, the stock stop means is preferably operated by a cam 180, which rotates once for each successive indexing of the spindle carrier and which may therefore be on or operated in timed relation with the cam shaft 74. The cam 180 imparts a motion, by means of a follower rod 181, to an assembly comprising the stock-stop unit 182 and an arm 183, adjustable on rod 181 with respect to the unit 182. Slidably mounted within the unit 182 and extending outwardly from the stock-stopping abutment head 184 thereon is a feeler rod 185, which is normally slidable between the limits fixed by the detent portions 186 and 187 (Fig. 22). The feeler rod 185 in the form shown carries two opposed conical camming surfaces 188 and 189, which may be adjustably mounted along the feeler 185 by means such as the locking nut 190.

In an intermediate extended position of the stock-stopping assembly (as results from the follower acting on surface 242 of cam 180), a feeding of stock 191 up to the stop 184 will involve displacing the feeler 185 within unit 182 from the position shown as being resiliently held by the detent 187, to the right-hand position for resilient retention by the detent 186 and ball 209. During this operation cams 188 and 189 will be displaced, so that cam 188 will engage the follower member associated with switch 192 carried by the assembly 182, and hence throw that switch from its normally open to a closed position. The switch 192 controls the solenoid 65 and the latter will be energized to lift the latch link 66 and thus permit continuous rotation of the cam shaft 74 as has been described. At the same time the gravity-operated follower 193 will be permitted by cam surface 189 to drop in a counterclockwise direction (in the sense of Fig. 23) to permit the rocker arm 194, which is fixed to shaft 195 and thus coupled to follower 193, likewise to rotate counterclockwise and to offset the spring pressed pin 196 from the path of the actuating arm 183 and the switch 201, as will be understood. The valve shifting solenoid 101 is controlled by the switch 201 and when the latter remains closed the solenoid holds the hydration valves in such position that no stock is fed hydraulically and the screw machine then functions normally.

In the detailed embodiment shown in Fig. 22 part of the stock-stopping mechanism is mounted on a bearing sleeve member 197 integral with the frame 198 of the machine. A plate 199, fixed to the bearing sleeve portion 197 as by means of bolts 200, serves as a support for the normally closed switch 201 and also carries the shaft 195 on which the follower-rocker assembly 193—194 is mounted. Thus the follower and rocker arms 193—194 are permitted merely the pivotal motion referred to and are otherwise fixed with regard to the machine itself.

The cam-follower shaft 181 may carry the stock stop unit back and forth by being adjustably secured to a bearing member 202, as by means of nuts 203. This bearing member is mounted on a guide shaft 204 carried by the frame. The shaft 204 may slide in the frame bearing 197 or the bearing member 202 may slide on the shaft 204. The bearing member 202 may be fixed to the stock stop unit 182 by means of a lug 205 thereon and a screw or bolt. The outer portion of unit 182 carries an inner sleeve portion 206 fixed therein, as by clamping means 206ª. A set screw 207 in an annular cup-shaped member 208 for carrying the ball detent assembly 209 permits adjustment of the ball detent unit longitudinally of and about the sleeve member 206. The stock stop unit is preferably slidably carried on the main tool slide 211 of the machine by a dovetail 210 sliding in the correspondingly dovetailed slot 211, as will be clear.

The stock stop unit may be provided with a thrust bearing 212 in rear of the stock stopping nose 213, so as to take the thrust of and permit free rotation of the nose 213 with the stock.

During normal operation, that is, when the screw machine is stocked, the stock is step fed by the screw machine and the latter goes through its normal operations of making piece parts. It should be noted here that during the cutting cycle of the screw machine the stock stop unit will be in retracted position and the roller of the cam follower rod 181 will be held by a spring on the low dwell portion of the cam 180. Before the stock is fed the cam 180 will rotate so as to advance the stock stop and hold it by the dwell portion 242. Normal stock feed will then be up to the nose 184 of the stock stop and before the collet is closed the cam 180 will rotate so that the high point on the cam will further advance the stock stop and force the overfed stock back to the desired position as determined by the adjustment of the stock stop. During normal operation the end of the fed stock will force the feeler rod 185 inwardly so that the cam 188 thereon will close the switch 192 so as to energize the solenoid 65 to raise the link and prevent the main feed clutch from being thrown out, as previously described. Such normal stock feed will also cause the cam 189 to release the lever 193 and drop the follower 194 out of the path of the arm 183 and the switch 201. The switch 201 controlling the solenoid 101 will therefore be unaffected and remain closed and the hydraulic valves will remain in the no-feed positions (not the positions of Fig. 20). Thus, so long as the screw machine operates normally and remains stocked the main feed clutch will not be disengaged and the hydraulic feed mechanism will remain inactive.

When a bar feeds short, regardless of the cause, the main feed clutch will be disengaged and remain so until the bar properly engages the stock stop. The normal cause of a short feed is exhaustion of stock and when a bar is exhausted my improved means will serve to feed a new bar from the reel to the spindle, eject the butt, feed up to the stock stop, and reengage the main feed clutch. My improved means may be described best in connection with a typical operation.

Figs. 20 to 23 show the positions of parts at that instant in the cycle of operations between successive indexings when a piece of stock has been fed short, due either to improper feed or to the remaining stock being too short to be fed all the way up to the stock stop; so that the feeler rod 185 will remain in projected position. The cam 188 on feeler rod 185 will not close the switch 192 and the solenoid 65 controlled thereby will not be energized. Therefore the latch 67 will be engaged with lever 71 and when the cam shaft 74 reaches the position of Fig. 20 (before index) the main feed clutch will be thrown out.

When cam follower bar 181 passed onto the high portion of cam 180, beginning at the point designated 243, the pin 196, being in the raised position between the arm 183 and switch 201 because of the failure of cam 189 to drop it out of position, the arm 183 engaged pin 196 to depress and open switch 201. Opening of the switch 201 serves to deenergize the valve solenoid 101 and permits the spring 102 to rotate the shaft 103 to the position shown. When solenoid 101 dropped out valve 104 moved to place the neck portion 115 thereof in a position to supply pressure fluid only for stock feeding, that is, the lubrication-outlet designated generally 136 was cut off, such supply of lubricant not being needed since the main feed clutch is disengaged almost simultaneously with this operation. At the same time the arm of bell-crank 108 has ridden off the cam surface 107 of the valve 104 to drop its finger 112 into position between lever 113 and reversing valve 106.

Due to the improper feed of stock, switch 192 has remained unaffected and in its normally open position, thus leaving solenoid 65 deenergized and members 71 and 67 latched, so that as cam 74 rotated and arm 71 was carried along its cam surface the main feed clutch was thereby disengaged and lever 113 rotated clockwise (in the sense of Fig. 20) to push reversing valve 106 to the right (by virtue of the aforementioned location of finger 112). This shifting of control valve 106 to the right-hand position as shown opened up a pressure fluid line from the pump 114 through line 117, to start the hydraulic feed circuit in operation. It will be seen, then, that the main feed clutch has been disengaged and the hydraulic feed operation has been started because of an improper feed of stock.

The pressure fluid being supplied through line 117 enters the hydraulic feed motor mechanism, designated generally 215, through port 218; and, due to the normal position of the control valve 220, the necked portion 49 thereof conducts such supplied fluid to the head of the feed piston. Upon a sufficient build-up of fluid pressure the feed piston is propelled forward to carry feed finger 90 and feed the bar of stock. Forward movement of the piston also carries the cross-head away from the shoe compressing the spring 220ᵃ and relieves the spring holding pressure on control valve 220, as will be clear. When the feed piston reaches its outermost position or, rather, when the stock has been fed thereby fully up to the stock stop, feeler 185 has been depressed, switch 192 operated to energize solenoid 65, and members 71 and 67 accordingly unlatched. Thus, the feed clutch remains disengaged but is not now locked in such disengagement. The lever 194, although otherwise now free to drop, is held up because the pin 196 is pinched in position between arm 183 and switch 201, and therefore the solenoid 101 remains deenergized and the control valves 106 and 104 remain as they are. Just after the feed piston began its travel to feed stock it uncovered the port of line 216 leading into the feed cylinder and thus pressure fluid was admitted through line 216. The resistance offered by valve 217 to passage of this supplied fluid in line 216 has been properly set to allow sufficient pressure to be supplied to the feed cylinder fully to extend the feed piston or feed the stock up to the stock stop before the valve will open to pass fluid. It will be recalled that when the crosshead 93 carried by the feed rod 89 was being impelled to its extended position it relieved spring 220ᵃ at the same time and thereby relieved the control valve 220 of any means for retaining it in the position shown. Thus the fluid that passes through valve 217 acts on the piston head portion 221 of valve 220, to displace that valve to the right, thereby exposing neck 222 to the fluid supply line 218 and directing fluid into the feed piston return line 228, to return the piston to its retracted normal position. With the shifting of valve 220 to the right the neck 219 was preferably made to establish an outlet for fluid which had been used to propel the feed piston. Fluid thus exhausted is carried off by line 229 for return to the sump and eventually reused. When the valve 220 was displaced to the right it carried its enlarged portion 240 to cover up the exhaust port of line 229. It will be seen, then, that while high pressure fluid was being used to return the feed piston it was simultaneously being used by means of the bypass connection 241 to retain the control valve 220 forcibly in its displaced position, even against the compression of spring 220ᵃ when the crosshead returned to place.

After a sufficient build-up of fluid pressure to assure return of the feed piston the valve 230 will open (it having been set at a sufficiently high pressure fully to return the feed piston) to pass fluid through line 133 to piston 135, upon the operation of which the lever 113 will be actuated and the main feed clutch reengaged, as will be understood. With a reengagement of the main feed clutch cam 180 has once more been set in motion and shortly thereafter the follower 181 will ride off the high portion of cam 180. This action will release the bearing of arm 183 upon switch 201 and will thus permit the switch to close and reenergize relay 100 to pick up its contacts and accordingly pick up solenoid 101. On the operation of solenoid 101 valve 106 is displaced to shut off fluid supply to the hydraulic feed circuit and at the same time opens up exhaust port 138 to relieve fluid compression on control valve 220, thereby allowing spring 220ᵃ to work the valve 220 back into its original position, as permitted by a small bleeder line in the piston head portion 221 of the control valve 220. Movement of the valve 106 also opens exhaust port 139 to permit the spring return of clutch engaging piston 135. Energizing of the solenoid 101 also shifts the valve 104 to reestablish pump communication with the lubricating line 136 and also displaces the lever 108 to its inactive position. Thus, the machine has again been set in normal operation.

In accordance with a further feature of my invention I provide means for rendering the restocking mechanism inoperative, so as to facilitate setting up, adjusting, etc. A preferred embodiment of this means is illustrated in detail in Fig. 21 (similar to Fig. 17) and schematically in Fig. 29. The device may comprise a crank 231 pinned to the shaft 103, which carries arms to actuate the spool valve 104 and the reversing valve 106. At its outer portion crank 231 is provided with a pin 232 having a knob portion 233 and which is normally held in clearance relation with a portion 234 of the main body of the machine, as by means of a cross pin 235, carried by the pin 232, resting on a shoulder of the body portion of the crank 231.

When it is desired to prevent hydraulic stock feeding while setting up or inspecting the machine the operator may rotate the knob 233 to insert pin 235 in its deep-seated receiving slot 235ª and this is done to seat the pin 232 in its receiving bore 232ª in a portion of the main body of the machine. It will be seen that when the arm 231 is thus locked against rotation the solenoid 101 is held in picked-up position, thus assuring that valve 106 has cut off the supply of pressure fluid to the hydraulic feed circuit 215. Regardless, then, of the energization or lack of energization of solenoid 101 it will remain in this position and no stock feeding will take place.

The machine is sturdy and reliable in operation. The time for automatic restocking of the screw machine is practically insignificant compared with the time required for hand stocking. Due to the safety devices provided there is substantially no likelihood of any of the parts becoming jammed with damage to the machine or to the operator; when trimming the end of a new bar is not necessary the stock is preferably fed up to the stock stop, and thus a piece part will be formed for each index.

While the invention has been described in considerable detail and preferred forms illustrated, it is to be understood that various changes and modifications may be made within the scope of the invention as defined in the appended claims.

I claim:

1. In a device of the character indicated, a screw machine having an indexible spindle carrier, means for indexing the same, a stock reel indexible with said spindle carrier and having means for carrying bar stock in alignment with each spindle, a magazine adjacent said stock reel, means for feeding bar stock from said magazine to said stock reel, means for automatically disengaging the feed clutch of said screw machine upon a run-out of stock in a spindle and between indexing movements of said spindle carrier, means for feeding a bar of stock from said stock reel to said last mentioned spindle while said feed clutch is disengaged, and means for automatically reengaging said feed clutch after completion of the stock feed from said reel to said spindle carrier.

2. In a machine of the character indicated, a bar machine including an indexible spindle carrier having a plurality of rotatable spindles, means for indexing said spindle carrier, a stock reel indexible with said spindle carrier and having means in alignment with each spindle for carrying bars of stock, a magazine adjacent said reel, means for feeding bar stock from said magazine to said reel, means for disengaging the feed clutch of said bar machine just prior to an indexing movement thereof, means for feeding a bar of stock from said stock reel to the spindle of said spindle carrier in loading station, and means for automatically reengaging said feed clutch after completion of the feeding movement of said bar of stock.

3. In a machine of the character indicated, a bar machine including a rotatable spindle, bar replenishing means together with means for positioning a bar in alignment with said spindle, fluid pressure actuated means for feeding a bar of stock from said bar replenshing means to said spindle, means for disengaging the feed clutch of said bar machine just prior to the feeding of said bar to said spindle, and fluid pressure actuated means for controlling the reengagement of said feed clutch after completion of the feeding of said bar of stock to said spindle.

4. In a machine of the character indicated, a bar machine including an indexible spindle carrier having a plurality of rotatable spindles, means for indexing said spindle carrier, a stock reel indexible with said spindle carrier and having means for holding a bar of stock in alignment with each of said spindles, a magazine for holding a plurality of bars of stock adjacent said stock reel, means for feeding bars of stock from said magazine to said stock reel upon completion of an indexing movement of said stock reel, means for automatically disengaging the feed clutch of said bar machine upon a run-out of stock in one spindle when said spindle reaches the loading station and the last piece part has been completed, means for automatically feeding a bar of stock from said reel to said spindle when in loading station and while said feed clutch is disengaged, and means for automatically reengaging said feed clutch after said bar of stock has been fed to said spindle in loading station.

5. In a machine of the character indicated, a bar machine including an indexible spindle carrier having a plurality of rotatable spindles, means for indexing said spindle carrier, a stock reel indexible with said spindle carrier and having means for carrying a bar of stock in alignment with each of said spindles, a magazine for bar stock adjacent said stock reel, means for feeding bar stock from said magazine to said stock reel, means for automatically feeding a bar of stock from said stock reel to a spindle in loading station, cam means for disengaging the feed clutch of said bar machine just prior to an indexing movement thereof, means for normally rendering said cam means inoperative to disengage said feed clutch, and means actuated upon a run-out of stock in any one of said spindles for rendering said cam means operative.

6. In a machine of the character indicated, a bar machine including an indexible spindle carrier having a plurality of rotatable spindles, means for indexing said spindle carrier, a stock reel indexible with said spindle carrier and having means for carrying a bar of stock in alignment with each of said spindles, a magazine adjacent said stock reel, means for feeding bar stock from said magazine to said stock reel, delayed action means for disengaging the feed clutch of said bar machine, and electrical means controlling said delayed action means, and means associated with each spindle for controlling the actuation of said electrical means upon a run-out of stock in any spindle, and means for automatically reengaging said feed clutch.

7. In a machine of the character indicated, a bar machine including a rotatable spindle, bar replenishing means for said spindle including fluid pressure actuated means for feeding a bar of stock from said bar replenishing means to said spindle, cam means for disengaging the main feed clutch on said bar machine, electrical means operable upon a run-out of stock in said spindle for rendering said cam means operative to throw said main feed clutch, fluid pressure actuated means for reengaging said main feed clutch, and electrically actuated means for controlling said last mentioned fluid pressure actuated means.

8. In a machine of the character indicated, a bar machine including a rotatable spindle, a main feed clutch for said machine, bar replenishing means for positioning a bar of stock in alignment with said spindle, fluid pressure actuated means for feeding a bar of stock from said bar replenishing means to said spindle, means for automatically disengaging said main feed clutch of said bar machine prior to feeding of a bar to said spindle, and fluid pressure actuated means for automatically reengaging said main feed clutch after feeding of a bar from said bar replenishing means to said spindle.

9. In a machine of the character indicated, an indexible stock reel for supplying bar stock to a bar machine, said stock reel including longitudinally extending seat means for holding the bar stock, feeding means for engagement with a bar of stock for feeding the same, said feed means including a finger member movable in said longitudinally extending means, means for moving said finger means longitudinally to cause said finger means to engage a bar of stock, and means for resiliently holding said finger means in angular position to engage a bar of stock, said means for resiliently holding said finger means being yieldable to permit partial rotation thereof upon indexing movement of said stock reel.

10. An indexible stock reel having a longitudinally extending groove therein for receiving bar stock, a feed bar movable longitudinally of said reel, a feed finger carried by said feed bar and movable in said groove, said feed bar and finger being angularly movable relatively to each other whereby upon an indexing movement of said stock reel said feed finger may move with the coacting groove in the stock reel, and means for normally and resiliently holding said feed finger in angular position such as to be engageable with a bar of stock in a groove in said stock reel.

11. In a machine of the character indicated, an indexible stock reel for carrying a plurality of bars of stock, a magazine adjacent said stock reel for carrying a plurality of bars of stock, means for feeding bars of stock from said magazine to said stock reel, control means affected by a bar of stock when improperly positioned in said reel, and means controlled by said control means for preventing indexing of said stock reel upon an improper positioning of a bar of stock relatively to said reel.

12. In a machine of the character indicated, a stock reel, means for indexing the same, a magazine for carrying a plurality of bars of stock and positioned adjacent said stock reel, means for feeding bars of stock from said magazine to said reel, control means affected by a bar of stock when positioned only partly in said reel, and means controlled by said control means for preventing indexing of said stock reel upon a positioning of only a part of a bar in said stock reel.

13. In a machine of the character indicated, a stock reel, means for indexing the same, a magazine for holding a plurality of stock bars and supplying the same to said reel, control means affected by a bar of stock when positioned improperly relatively to said magazine and reel, and means controlled by said control means for preventing indexing of said stock reel upon an improper positioning of a bar of stock relatively to said magazine and reel.

14. In a machine of the character indicated, a bar machine including an indexible spindle carrier having a plurality of spindles, a stock reel having means for carrying a bar of stock in alignment with each of said spindles, a magazine adjacent said stock reel, means for feeding stock from said magazine to said stock reel, said means for feeding including a periodically actuated machine member, and means for rendering the latter inoperative to feed stock including a member engageable with a bar of stock in said reel.

15. In a machine of the character indicated, a bar machine including an indexible spindle carrier having a plurality of rotatable spindles, an indexible stock reel indexible with said spindle carrier, a magazine adjacent said stock reel, means for feeding bar stock from said magazine to said stock reel including a periodically operated machine member, and means when engaged by a bar of stock in said stock reel for rendering said feed means inoperative.

16. In a machine of the character indicated, an indexible stock reel, a magazine for supplying stock to said stock reel, means for feeding bar stock from said magazine to said stock reel, and a shoe engageable simultaneously by adjacent bars of stock in said stock reel for rendering said feed means inoperative while engaging one or more bars of stock in said stock reel and for permitting operation of said feed means upon disengagement of said shoe from all bars in said stock reel.

17. In a machine of the character indicated, an indexible stock reel, a magazine adjacent said stock reel for supplying bars of stock thereto, feed means for normally feeding stock bars from said magazine to said stock reel, a relatively fixed cam engageable by the rear ends of bars carried by said stock reel for advancing said bars by and upon an indexing movement of said stock reel, and means rendered inoperative by engagement with the projected end of the stock bar for preventing feeding of another stock bar.

18. A fluid pressure actuated motor, including a piston and cylinder, a valve for controlling fluid pressure thereto, means for holding said valve in one position to cause movement of said piston and cylinder relatively to each other in one direction, means controlled by the movement of said piston and cylinder in said direction for freeing said valve, and loading means for quickly moving said valve to reverse position for reversing the flow of pressure fluid to said piston and cylinder, for the purpose described.

19. A fluid pressure actuated motor, including a piston and cylinder, a valve for controlling fluid pressure thereto, means for holding said valve in one position to cause movement of said piston and cylinder relatively to each other in one direction, means controlled by the movement of said piston and cylinder in said direction for freeing said valve, loading means for quickly moving said valve to reverse position for reversing the flow of pressure fluid to said piston and cylinder, means for latching said valve in said reverse position, and means controlled by the movement of said piston and cylinder in reverse direction for freeing said valve.

20. In a fluid pressure actuated means, including a piston and cylinder, a pair of valves, means for moving one of said valves, clutch throw-out means, and means controlled by said one of said valves and coacting with said clutch throw-out means for shifting the other of said valves, for the purpose described.

21. In a fluid pressure actuated means including a piston and cylinder, a first valve, a second valve, means for moving said first valve, clutch throw-out mechanism, and means controlled by the position of said first valve for coaction with said clutch throw-out means and said second valve for shifting the latter.

22. In a fluid pressure actuated means including a piston and cylinder, a pair of valves, clutch throw-out mechanism, means actuated thereby for shifting one of said valves, and fluid pressure actuated means for actuating said clutch throw-out means in at least one direction.

23. In a machine of the character indicated, a bar machine including a rotatable spindle, a main feed clutch for the bar machine, bar replenishing means for positioning a bar of stock in alignment with said spindle, bar feeding means for feeding a bar of stock from said replenishing means to said spindle, means for disengaging said main feed clutch and actuating said bar feeding means, and means controlled by a bar of stock in said spindle when fed to a predetermined point for rendering said clutch disengaging means and bar feeding means inoperative.

24. In a machine of the character indicated, a bar machine including a rotatable spindle, bar feeding means for feeding a bar to said spindle, a stock stop and feeler means associated therewith and positioned in the path of fed stock in said spindle, and means controlled by said feeler means for rendering said stock feed means inoperative when said feeler means is engaged by a bar of stock in said spindle.

25. In a machine of the character indicated, a bar machine including a rotatable spindle, a main feed clutch for said bar machine, disengaging means for said clutch, a stock stop and feeler means associated therewith and positioned in the path of fed stock in said spindle, and means controlled by said feeler means for rendering said disengaging means inoperative when said feeler means is engaged by a bar of stock in said spindle.

26. In a machine of the character indicated, a bar machine including a stock holder, bar feeding means for feeding a bar in said holder, a stock stop and electric switch means associated therewith and positioned to be actuated by stock fed from said holder, and machine control means controlled by said electric switch means.

27. In a machine of the character indicated, a bar machine having an indexible work carrier, a plurality of work holders carried thereby, indexing means for said work carrier, means for step feeding bar stock in said work holders, control means positioned to be engaged by a bar in one of said holders when fed a predetermined distance, and means controlled by said control means for controlling said indexing means.

28. In a device of the character indicated, a screw machine having an indexible spindle carrier, means for indexing the same, a main feed clutch for said screw machine, spindles carried by said spindle carrier, a stock reel indexible with said spindle carrier and having means for carrying bar stock in alignment with each spindle, a magazine adjacent said stock reel, means for feeding bar stock from said magazine to said stock reel, means for automatically disengaging said main feed clutch between indexing movements of said spindle carrier upon a run-out of stock in a spindle, means for feeding a bar of stock from said stock reel to said last mentioned spindle while said main feed clutch is disengaged, means associated with each spindle and independent of said last mentioned bar feeding means for feeding bar stock in each said spindle, and means for automatically reengaging said main feed clutch after completion of the stock feed from said reel to a spindle of said spindle carrier.

29. In a machine of the character indicated, a bar machine having a rotatable spindle, magazine means for supplying bar stock to said spindle, bar stock feed means for feeding bar stock to said spindle, bar stock feed means carried by said spindle for feeding bar stock therein, stock feeler means positioned forwardly of said spindle and engageable by the forward end of a stock bar fed out of said spindle, means for disengaging the main feed clutch of said bar machine, and means controlled by said stock feeler means when engaged by the forward end of a stock bar in said spindle for rendering said main feed clutch disengaging means inoperative.

ARTHUR H. JOBERT.